R. W. MAGNA.
SNAP CONTACT.
APPLICATION FILED DEC. 16, 1908.

981,933.

Patented Jan. 17, 1911.

WITNESSES:
A. C. Fairbanks.
J. M. Sterne

INVENTOR.
Russell W. Magna,
BY Webster & Co.
ATTORNEYS.

UNITED STATES PATENT OFFICE.

RUSSELL W. MAGNA, OF HOLYOKE, MASSACHUSETTS.

SNAP CONTACT.

981,933.   Specification of Letters Patent.   Patented Jan. 17, 1911.

Application filed December 16, 1908. Serial No. 467,807.

*To all whom it may concern:*

Be it known that I, RUSSELL W. MAGNA, a citizen of the United States of America, residing at Holyoke, in the county of Hampden and State of Massachusetts, have invented a new and useful Snap Contact, of which the following is a specification.

My invention relates to improvements in devices employed in making electrical connections, and particularly to a certain peculiar clip or clamp of the snap variety, as hereinafter set forth.

The object of my invention is to provide a reliable and efficient though simple snap-contact with which electrical connections can be easily and quickly made and unmade, such device being especially adapted for engagement with and disengagement from the binding-posts of electric batteries, and when engaged with such a post to grip the same firmly and securely. I attain this object by the means illustrated in the accompanying drawings, in which—

Figure 1:
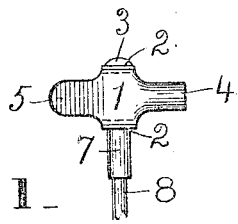
Figure 2:
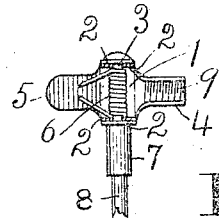
Figure 3:
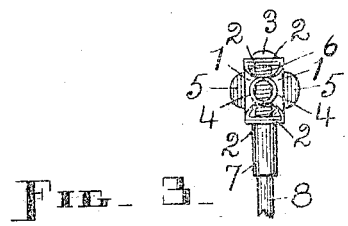
Figure 4:
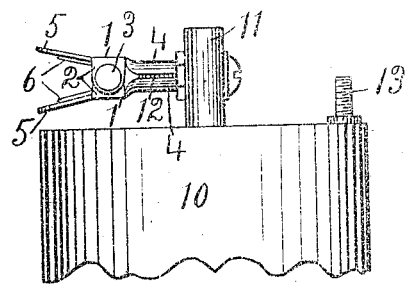

Figure 1 is a side elevation of my device; Fig. 2, an interior view of said device, one side being removed; Fig. 3, a front end view of the device, and, Fig. 4, a view showing the device connected with one of the binding-posts of a dry battery, the upper end portion only of such battery being shown in elevation.

Similar figures refer to similar parts throughout the several views.

Although this snap-contact is designed particularly for use with electric batteries which have the ordinary screw-threaded binding-posts, it is not necessarily limited to such use.

The device, when employed with electric batteries, is especially applicable to battery boxes for automobiles, for testing batteries, and for other purposes which make it desirable to connect batteries or to place them in circuit with despatch and ease, either when the connections are to be temporary or otherwise, and to this end I provide a clip or clamp, comprising pivotally-connected spring-pressed members, with longitudinally concave jaws which are preferably screw-threaded or cut in some other manner so as to afford a firm, secure, and complete engagement with a screw-threaded binding-post. The screw-threading, abrading, roughening, or other cutting of the aforesaid jaws to insure an interlocking engagement with the screw-threaded binding-post is done, of course, in the inside. The snap-contact can be disconnected from a binding-post as readily as it can be connected therewith.

Referring to the drawings it will be observed that I there show a device which consists in the main of two mutually oscillatory members 1 provided with inwardly extending lugs 2 which are mounted on a pivot pin 3, there being two pairs of such lugs arranged one pair inside of and contiguous to the other pair, and further provided with jaws 4—4 at their forward ends and with ears 5—5 at their rear ends, and of a coil spring 6 around said pin inside of said lugs, the terminals of said spring projecting backwardly and outwardly to bear against the inner surfaces of said members 1 or of their ears in such a manner as to thrust the latter apart and so throw said jaws into their normal gripping or closed position. In addition to these parts there is a socket or sleeve 7 which depends or projects from the face of one of the outer ears 5 to receive one end of an electrical conductor or wire 8, such conductor usually being insulated. The conductor or wire 8, to which the snap-contact is attached, in the present instance by having one end secured within the sleeve 7, is one of the circuit-forming members with which my invention is used and constitutes a flexible connection whereby the rapid manipulation of said invention is facilitated. There may be another snap-contact on the other end of the wire 8, or such end may have a fixed or permanent attachment, according to the use to be made of the same.

Each jaw 4 is concave or approximately semi-tubular in the direction of its length, or, in other words, the axis of the concavity is at right-angles to the axis of the members 1, viz., the pin 3, and the interior of said jaw is, in this case, screw-threaded, as indicated at 9, in Fig. 2. The jaws 4 might be much shorter than shown in the drawings, and a mere abrading or roughening of the interior surfaces, wholly or in part, of the same may be resorted to in place of the screw-threads 9, or a single thread or its equivalent may be substituted, so long as provision is made for a good engagement between the jaws and a binding-post, as hereinbefore intimated. Moreover, the jaws may be made smooth on the interior, but not without impairing to a considerable extent the efficiency of the device.

In the last view, a part of a dry battery is represented at 10, with its carbon-electrode at 11, and its positive and negative binding-posts at 12 and 13, respectively. One of my snap-contacts is shown in position on the binding-post 12, in this view, but it will be seen that it might just as well be placed on the binding-post 13. To engage or disengage the device with or from either of the binding-posts, it is simply necessary to press together the ears 5, against the resiliency of the spring 6, to separate or open the jaws 4, slip said jaws on to the binding-post, and then release said ears to permit the jaws to close on and grip said binding-post under the influence of said spring, on the one hand, or to press together the ears sufficiently to separate the jaws from the binding-post, and then withdraw them therefrom and release the ears, on the other hand. The screw-threads 9 interlock with the binding-post screw-threads, when the device is snapped into place on the post, and so prevent accidental disconnection of the parts, while at the same time affording a perfect electrical contact. The construction of the device is such that said device will fit binding-posts of different sizes or diameters, provided the difference be not too great. The conductor 8 should be of sufficient length to enable the snap-contact to be handled freely.

While I have illustrated only one application of the invention, it is manifest that it is applicable under many different circumstances and conditions.

Although I have shown and described a preferred form of my invention, I do not desire to be restricted to the same in matters of shape, size, and minor details of construction, nevertheless, I am aware that spring-pressed clasps of various kinds for various purposes are old, hence do not seek to claim such a device broadly, but What I do claim, and desire to secure by Letters Patent, is—

The combination, in a snap-contact, of a pin, mutually-oscillatory members provided with two pairs of inwardly-extending lugs mounted on such pin, one pair of such lugs being inside of and contiguous to the other pair, semi-tubular jaws at the forward ends and ears at the rear ends of such members, such jaws being interiorly cut to engage the screw-threads of a binding-post, a spring encircling said pin and bearing on said members behind the pin to force said jaws toward each other, and a sleeve, adapted to have an electrical conductor attached thereto, projecting from one of the outer lugs, the arrangement of parts being such that the axis of the semi-tubular jaws is at right-angles to the pin.

RUSSELL W. MAGNA.

Witnesses:
F. A. CUTTER,
A. C. FAIRBANKS.